United States Patent
Chou et al.

(10) Patent No.: US 6,808,296 B2
(45) Date of Patent: Oct. 26, 2004

(54) COOLING APPARATUS FOR OPTICAL ENGINE ASSEMBLY

(75) Inventors: Bor-Bin Chou, Hsin-Chu (TW); Chih-Chung Kang, Hsin-Chu (TW); Chien-Ming Tsao, Hsin-Chu (TW)

(73) Assignee: Coretronic Corporation, Chu-Nan (TW)

( * ) Notice: Subject to any disclaimer, the term of this patent is extended or adjusted under 35 U.S.C. 154(b) by 0 days.

(21) Appl. No.: 10/249,122

(22) Filed: Mar. 18, 2003

(65) Prior Publication Data

US 2003/0179591 A1 Sep. 25, 2003

(30) Foreign Application Priority Data

Mar. 22, 2002 (TW) ........................................ 91203841 U

(51) Int. Cl.[7] .............................................. F21V 29/02
(52) U.S. Cl. ........................ 362/373; 362/294; 362/19; 353/52
(58) Field of Search .............................. 362/294, 373, 362/580, 19; 353/61, 52, 57; 349/161, 58

(56) References Cited

U.S. PATENT DOCUMENTS 6,132,049 A * 10/2000 Yamaguchi et al. .......... 353/61
6,431,710 B2 * 8/2002 Fuse et al. ................... 353/57
6,481,854 B1 * 11/2002 Sugawara et al. ............ 353/52
6,698,899 B2 * 3/2004 Yamada et al. ............... 353/61

* cited by examiner

Primary Examiner—Alan Cariaso
Assistant Examiner—Ali Alavi
(74) Attorney, Agent, or Firm—Winston Hsu

(57) ABSTRACT

The present invention sucks the air from the fan at the top of the imaging assembly of the optical engine and blows the air via the air duct device downward. Some of the air is guided by the diversion board, aslant guiding surface, and aslant isolating board of the air duct device and blown into the imaging assembly for cooling the optical components. Some of the air is guided through a first air duct, a second air duct, and a third air duct extended from the outside of this main body respectively to the outer surface of the light valves. Further, some of the airflow is guided into a branch air duct and blown to a vent of the imaging assembly. By means of the changing direction diversion board, the airflow is guided towards the polarizer module, and flows out from a vent on the other side.

8 Claims, 5 Drawing Sheets

COOLING APPARATUS FOR OPTICAL ENGINE ASSEMBLY

BACKGROUND OF THE INVENTION

1. Field of the Invention

The present invention relates to an optical engine of projector, and more particularly, to a cooling apparatus for optical engine assembly.

2. Description of the Prior Art

As the optical-electronic technology develops in a fast phase, the general projecting display device usually uses the high power bulb as the light source to project a clearer image with high brightness. However, the high power bulb also produces high temperature at the same time. Therefore, a fan is used for cooling such prior-art projecting display device to avoid the rise in temperature and the deterioration of optical components due to the light incidence of the bulb. Although the fan is used for the heat dissipation, it also generates noises. Therefore, the improvement of heat dissipation with a limited fan becomes an important research and development topic for the industry.

Please refer to FIG. 1, which shows an imaging assembly 10 of an optical engine of a prior-art display device, and a projecting lamp (not shown in the figure) is installed under the imaging assembly 10. The white beam emitted from the projecting lamp as shown in FIG. 2 is divided into three colors: red, blue, and green by a X-plate 12 inside the housing 11 of the image assembly 10, and each colored light is guided into three polarizer modules 13, 14, 15 each comprised of a polarizer and a half wave plate, and modulated by three sets of modulating units comprised of three light valves 161, 162, 163, and synthesized by a X-cube 17, and finally projected onto a screen from a projection lens (not shown in the figure) disposed at the front end of the X-cube 17.

The high intensity light projected by the foregoing high-power light bulb passes through the optical components such as the X-plate 12, three polarizer modules 13, 14, 15, three light valves 161, 162, 163 and the X-cube 17, and will produce heat of high temperature. Heat dissipation must be performed, so that the temperature will not exceed the suitable operating temperature range, or else affecting the properties of the optical components and deteriorating the color and optical evenness of the image as well as lowering the quality of projection, or even damaging the expensive optical components in some serious cases. Although the high intensity light emitted by the foregoing high-power projecting lamp will heat up the temperature of each optical component along the optical path, this invention only intends to solve the heat dissipation problem of the optical components in the reflecting LCD image assembly 10, and the description of the heat dissipation of the related prior-art imaging assembly 10 will be given below.

The three light valves 161, 162, 163 of the aforementioned prior-art assembly 10 are respectively fixed onto the front and both sides of the housing 11, and two through holes 111, 112 with aslant surface are disposed in the front section of the housing 11, and fans 181, 182 is respectively mounted onto each hole such that the fans 181, 182 are disposed between the three light valves 161, 162, 163 for sucking the air from the outside. The air is blown to the related optical components between the three sets of modulating units, and the direction of airflow is shown by the arrows in FIG. 2. The air flow dissipates the heat produced by the X-plate 12, the polarizer modules 13, 14, 15, the light valves 161, 162, 163 and the X-cube 17 in the housing 11. However, since the top of the housing 11 is sealed and only the bottom has openings, and the three light valves 161, 162, 163 are fixed onto the side of the housing 11, the air is blown through the three sets of modulating units. Most of the air from the fans 181, 182 through the three sets of modulating units can only be blown to the optical components such as the X-plate 12, the polarizer modules 13, 15 on both sides, and the X-cube 17. It is difficult for the air to be blown into the corners of the polarizer module 14 for a through heat dissipation. In the meantime, only a small portion of the bouncing air is blown to the surfaces of the three light valves 161, 162, 163 and the air is unable to blow onto the external surface of the housing 11. It thus causes the uneven airflow in the housing 11, and makes the light valves 161, 162, 163 and the polarizer module 14 unable to effectively dissipate the heat which affects the functions of the optical components or even deteriorates the optical components due to the high temperature. In addition, the two fans 181, 182 used in the imaging assembly 10, also increases the noise, that lowers the quality of the entire projecting display device.

SUMMARY OF THE INVENTION

The objective of this invention is to provide a cooling apparatus for optical engine assembly that evenly distributes the airflow inside and outside the imaging assembly to enhance the heat dissipation efficiency of the optical components and extend the life of the optical components.

Another objective of this invention is to provide a cooling apparatus for optical engine assembly that comes with a fan to effectively use the heat dissipation efficiency of the airflow to reduce the use of fans, lower the cost, noise, and complexity of circuit control.

Another further objective of this invention is to provide a cooling apparatus for optical engine assembly that uses a changing direction diversion board to interfere the horizontal airflow and the vertical airflow in order to enhance the heat dissipation effect.

To achieve the above objectives, the present invention sucks in the air from the fan at the top of the imaging assembly of the optical engine and blows the air from the air duct device downward. Some of the air is guided by the diversion board, aslant guiding surface, and aslant isolating board of the air duct device and blown into the imaging assembly for cooling the optical components. Some of the air is guided through a first air duct, a second air duct, and a third air duct extended from the outside of this main body respectively to the outer surface of the light valves for beat dissipation. Further, some of the airflow is guided into a branch air duct and blown to a vent of the imaging assembly of the optical engine. By means of the changing direction diversion board, the airflow is guided towards the polarizer module such that the heat at the projection lens of the polarizer module can fully be dissipated, and flown out from a vent on the other side. It produces a lateral airflow, and interferes with the vertical airflow blown directly downward from the fan into the interior of the housing.

To make it easier for our examiner to understand the objective of the invention, its structure, innovative features, and performance, we use a preferred embodiment together with the attached drawings for the detailed description of the invention.

BRIEF DESCRIPTION OF DRAWINGS

Other features and advantages of the present invention will become apparent in the following detailed description of the preferred embodiments with reference to the accompanying drawings, in which.

DETAILED DESCRIPTION

Figure 1:
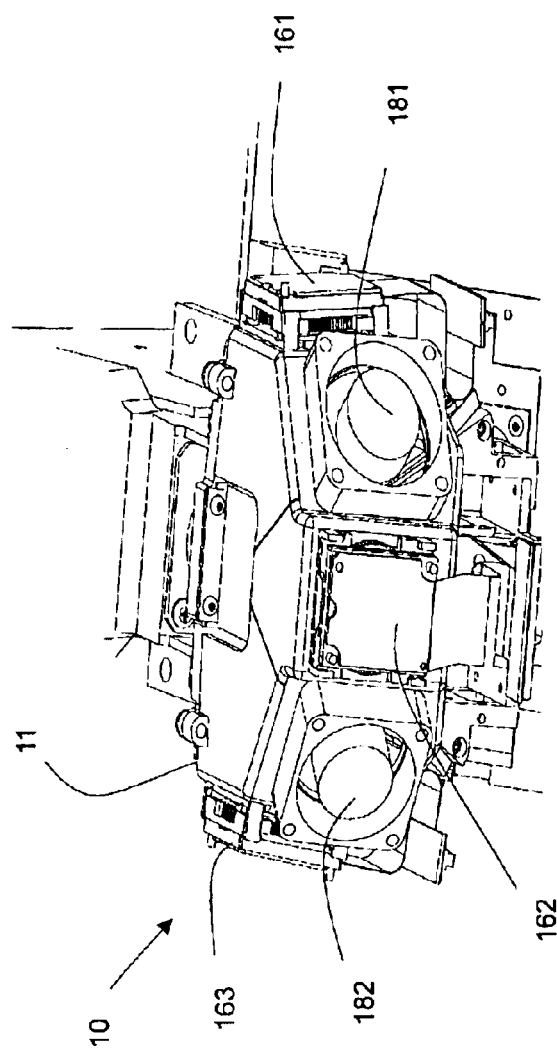
FIG. 1 is a perspective view of an imaging assembly of a prior art optical engine.
Figure 2:
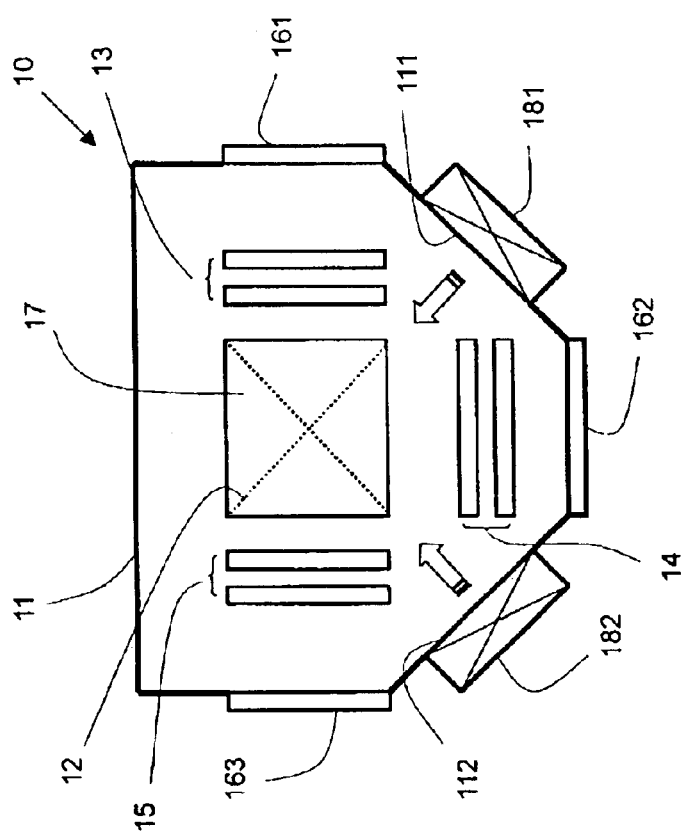
FIG. 2 is a cross-sectional diagram of an imaging assembly of a prior art optical engine.

In the detailed description of the preferred embodiments, it should be noted that like elements are indicated by the same reference numerals throughout the disclosure.

Figure 3:
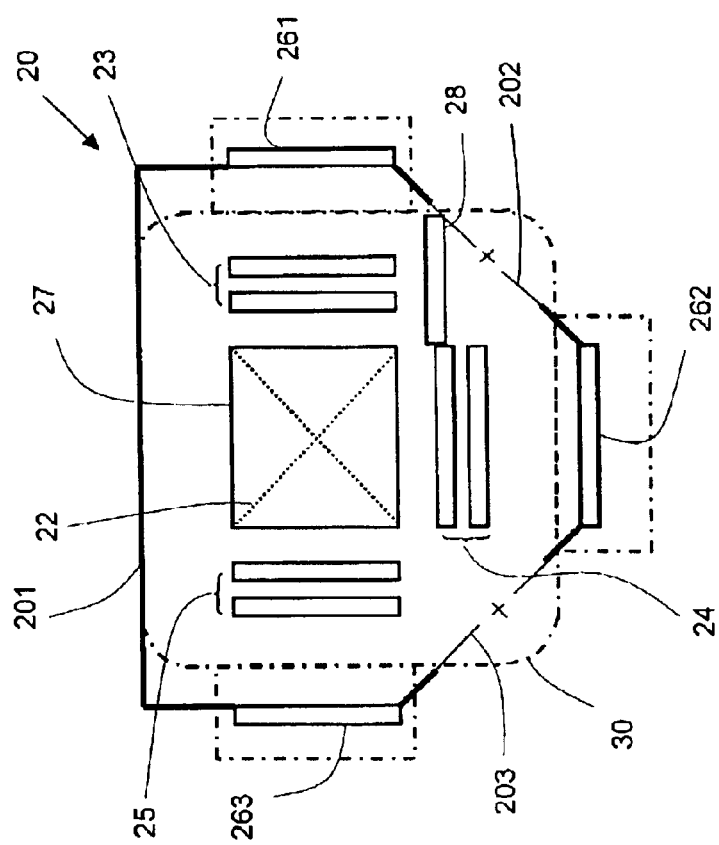
FIG. 3 is a cross-sectional diagram of an imaging assembly of an optical engine according to the present invention.

Please refer to FIG. 3 for a preferred embodiment of the present invention, comprising an imaging assembly 20, wherein two vents 202, 203 are disposed at an aslant surface of a housing 201. A light source (not shown in the figure) is installed below the imaging assembly 20. The beam emitted from the light sources passes through the X-plate 22 inside the imaging assembly 20.

The white beam is divided into three colors: red, blue, and green by a X-plate 22 and each colored light is guided into three polarizer modules 23, 24, 25 each comprised of a polarizer and a half wave plate, and modulated by three sets of modulating units comprised of three light valves 261, 262, 263, and synthesize by a X-cube 27, and finally projected onto a screen from a projection lens (not shown in the figure) disposed at the front end of the X-cube 27. Further, the dotted line represents the relative position on which an air duct device 30 of a preferred embodiment of the present invention is covered on the housing 201, and a changing direction diversion board 28 is disposed on a side of the polarizer module 24.

Figure 4:
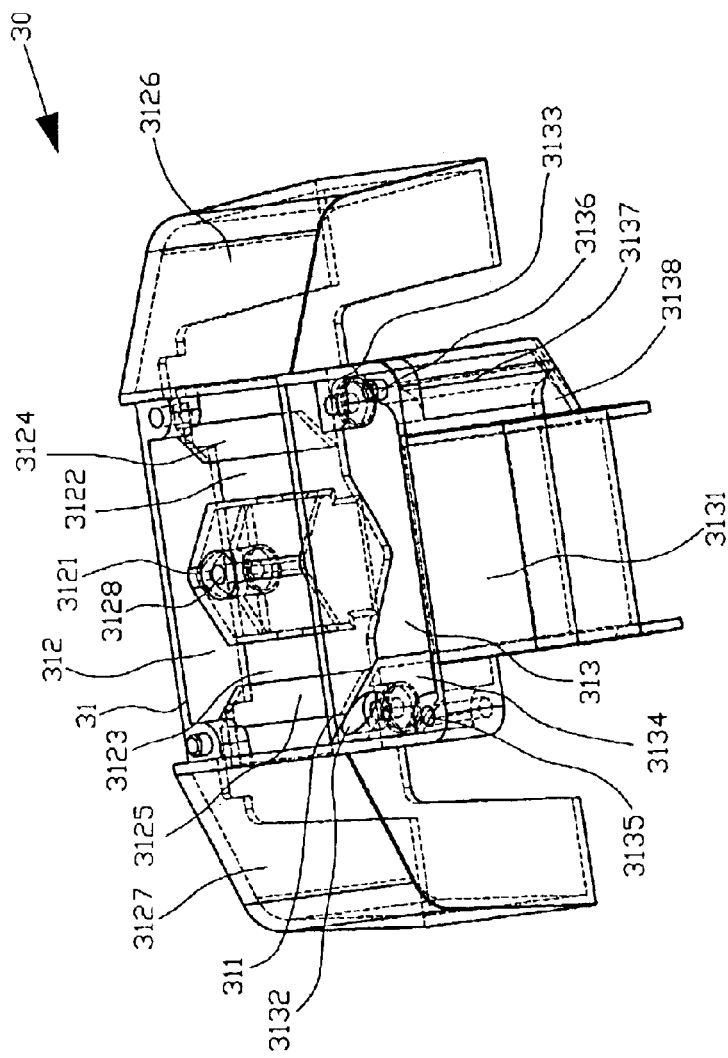
FIG. 4 is a structural diagram of the air duct device according to the present invention.

In FIG. 4, a main body 31 of the air duct device 30 is isolated by a partition 311 into a front air duct 312 and a rear air duct 313. A first air duct 3131 is formed on one side of the main body 31 of the rear air duct 313. The first air duct is extended from the outside of the main body 31, and form a downwardly opened opening. In addition, a bolt hole 3132, 3133 is disposed on each side of the main body 31 at the rear air duct 313, and the bolt hole 3132 is disposed on the downwardly aslant guiding surface 3134. A positioning hole 3135 and a positioning latch 3136 are disposed respectively on two corners of the main body 31, and a branch air duct 3137 extended downward and disposed under the corner of the main body 31 where the positioning latch 3136 is located. An outlet at the inner side of the guiding direction is formed at the end of the branch air duct 3137 by a guiding board 3138.

Furthermore, the front air duct 312 of the air duct device 30 is located at its center, and divided into a right air duct 3122 and a left air duct 3123; an aslant isolating boards 3124, 3125 is disposed in the right air duct 3122 and a left air duct 3123. The aslant isolating board 3124, 3125 is respectively disposed in the direction opposite to the two aslant surface of the diversion isolating board 3121 between the right air duct 3122 and the left air duct 3123. The right air duct 3122 and the left air duct 3123 are then divided into two again, such that the right air duct 3122 and the left air duct 3123 at the sides of the main body 31 respectively form a second air duct 3126 and a third air duct 3127 and extend respectively to the outer side of the main body 31 of the air duct, and their outlets form a downwardly opened outlet. A bolt hole 3128 is disposed at the center of the guiding isolating board 3121. The above arrangement constitutes an air duct device 30 for dissipating heat.

Figure 5:
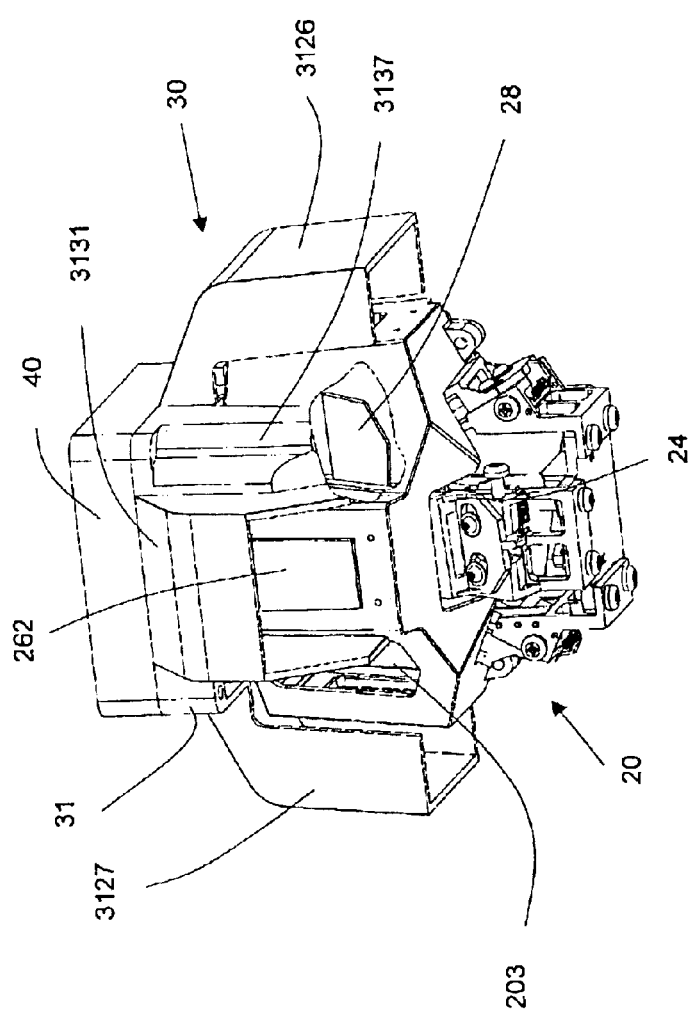
FIG. 5 is a perspective view of the heat dissipation device of an imaging assembly of the optical engine according to the present invention.

In FIG. 5, the air duct device 30 of this invention is disposed on the housing 201 of the imaging assembly 20 of the optical engine. By means of the bolt holes 3132, 3133, 3128 of the air duct device 30, the air duct device 30 is fixed onto the housing 201, such that the outlets including the first air duct 3131, the second air duct 3126, and the third air duct 3127 of the air duct device 30 respectively lead to the external surfaces of the light values 261, 262, 263.

Furthermore, the outlet of branch air duct 3137 of the air duct device 30 is guided to a vent 202 on the aslant surface of the housing 201 of the imaging assembly 20. In addition, a fan 40 is disposed at the upper side of the main body 31 of the air duct device 30 to cooperate with the positioning latch 3136 and the positioning hole 3135 to fix the fan to the air duct device 30.

When the heat dissipation device of the imaging assembly according to a preferred embodiment of the present invention performs the cooling operation, the fan 40 at the upper section sucks in the air at the upper section, and blows the air downward from the air duct device 30. By means of the guidance of the guiding isolating board 3121, aslant guiding surface 3134, and aslant guiding board 3124, 3125, some of the airflow is blown inside the imaging assembly 20 for cooling the optical components including the X-plate 22, the polarizer modules 23, 24, 25 and the X-cube 27 and the inner surface of the light valves 261, 262, 263. Some of the air is guided through a first air duct 3131, a second air duct 3126, and a third air duct 3127 extended towards the external side of the main body 31. The outlets of the first air duct 3131, the second air duct 3126 and the third air duct 3127 a are led respectively to the external surfaces of the light valves 261, 262, 263 for performing the heat dissipation.

Further, some of the air is guided into the branch air duct 3137 extended towards the external side of the main body 31 and led to a vent 202, and then blown towards the vent 202 via the guiding board 3138. By means of the guidance of the changing direction diversion board 28, the airflow is guided to blow towards the polarizer module 24, so that the airflow passes through the polarizer module 24 between the lenses and allows the lens of polarizer module 24 to be cooled thoroughly, and then be flown out from a vent 203 on the other side. It produces a lateral airflow, and interferes with the vertical airflow blown directly downward from the fan 40 into th interior of the housing 201 and thus enhancing the heat dissipation effect. By the above air duct device 30 and the changing direction diversion board 28, an even smooth flow is formed inside the imaging assembly 20 to evenly allocate the cool air effectively use a single fan 40 to blow out the airflow, reduce the number of fans used, and lower the cost, noise, and complexity of the circuit control.

Similarly, the reflection LCD light valve system used as an example for the description of a preferred embodiment of this invention can be applied to the optical system having similar structures such as the light valve of a digital micromirror device or the penetrative LCD light valve.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A cooling apparatus for optical engine assembly, comprising:
    an imaging assembly having a housing and an interior in the housing, the interior comprising a changing direction diversion board and a polarizer module, wherein the changing direction diversion board is disposed on one side of the polarizer module;
    at least a light valve mounted on the housing, wherein an external surface of the at least a light valve contacts an exterior outside the housing;
    an air duct device covered onto the housing, the air duct device comprising a main body, wherein the main body is divided into a plurality of air ducts by at least one isolating board, the air ducts leading to the interior the external surface of the at least a light valve via an external side of the housing and the changing direction diversion board; and
    a fan, fixed above the air duct device;
    Wherein airflow generated by the fan is separately conducted to the interior, the external surface of the light valve and the polarizer module via the changing direction diversion board.

2. The cooling apparatus of claim 1, wherein the housing of the imaging assembly comprises at least one vent, and the plurality of air ducts comprise a branch air duct extending towards a vent via the external side of the housing, an outlet of the branch air duct facing the changing direction diversion board.

3. The cooling apparatus of claim 1, wherein the at least one isolating board comprises a partition for dividing the main body into a front air duct and a rear air duct and a diversion isolating board with two aslant surfaces for dividing the front air duct into a left air duct and a right air duct, the diversion isolating board causing that outlets of the left air duct and the right air duct smaller than inlets of the left duct and the right air duct respectively.

4. The cooling apparatus of claim 3, wherein the at least one isolating board further comprises an aslant isolating board for dividing the right air duct into an internal air duct leading to the imaging assembly and a second air duct leading to the an external surface of one of the at least one light valves.

5. The cooling apparatus of claim 3, wherein the at least one isolating board further comprises an aslant isolating board for dividing the left air duct into an internal air duct leading to the imaging assembly and a third air duct leading to an external surface of one of the at least one light valve.

6. The cooling apparatus of claim 3, wherein the rear air duct extends a first air duct towards an external surface of one of the at least one light valves.

7. The cooling apparatus of claim 3, wherein the housing of the imaging assembly comprises one vent, and the rear air duct extends a branch air duct toward the vent via the external side of the housing, the outlet of the branch air duct facing the changing direction diversion board.

8. The cooling apparatus of claim 3, wherein a side of the rear air duct is a downwardly aslant guiding surface such that an outlet of the rear air duct is smaller the an inlet of the rear air duct.

* * * * *